(12) United States Patent
Isberg et al.

(10) Patent No.: US 9,949,048 B2
(45) Date of Patent: Apr. 17, 2018

(54) CONTROLLING OWN-VOICE EXPERIENCE OF TALKER WITH OCCLUDED EAR

(71) Applicant: Sony Mobile Communications Inc., Toyko (JP)

(72) Inventors: Peter Isberg, Lund (SE); Andrej Petef, Lund (SE); Olivier Moliner, Lund (SE); Ola Thörn, Limhamn (SE)

(73) Assignee: SONY MOBILE COMMUNICATIONS INC, Tokyo (JP)

( * ) Notice: Subject to any disclaimer, the term of this patent is extended or adjusted under 35 U.S.C. 154(b) by 0 days.

(21) Appl. No.: 15/356,642

(22) Filed: Nov. 20, 2016

(65) Prior Publication Data
US 2017/0171679 A1 Jun. 15, 2017

(30) Foreign Application Priority Data
Dec. 15, 2015 (EP) ..................... 15200130

(51) Int. Cl.
*H04R 1/10* (2006.01)
*H04R 29/00* (2006.01)
(Continued)

(52) U.S. Cl.
CPC ........... *H04R 29/001* (2013.01); *G06F 3/162* (2013.01); *H04R 1/1016* (2013.01);
(Continued)

(58) Field of Classification Search
CPC .. H04R 29/001; H04R 1/1016; H04R 1/1091; G06F 3/162
See application file for complete search history.

(56) References Cited

U.S. PATENT DOCUMENTS

2009/0097681 A1* 4/2009 Puria .................... H04R 25/405
381/318
2009/0310805 A1 12/2009 Petroff
(Continued)

FOREIGN PATENT DOCUMENTS

| WO | 2004021740 A1 | 3/2004 |
| WO | 2014194932 A1 | 12/2014 |
| WO | 2014198307 A1 | 12/2014 |

OTHER PUBLICATIONS

European Search Report from corresponding European Application No. 15200130, dated Jun. 3, 2016.
(Continued)

*Primary Examiner* — Simon King
(74) *Attorney, Agent, or Firm* — Tucker Ellis LLP

(57) ABSTRACT

A system and method are provided for controlling the own-voice experience of a user who talks while an earpiece is mounted to occlude an ear of the user. A vibration sensor is engaged with the user's head to sense vibrations formed by the user speaking and conducted by the user's head to the vibration sensor. A signal generator operates a speaker element, which is integrated with the earpiece, to generate sound waves in the ear canal of the user, based on the output signal of the vibration sensor. The signal generator generates the sound waves to at least partially cancel other sound waves that are generated by at least part of said vibrations entering the ear canal from surrounding bone and/or tissue. The system and method counteracts the occlusion effect and are applicable in connection with in-ear headsets, earphones, in-ear headphones, in-ear monitors, circumaural headphones, hearing aids, earplugs and earmuffs.

14 Claims, 4 Drawing Sheets

(51) Int. Cl.
*G06F 3/16* (2006.01)
*G10L 25/84* (2013.01)
*H04R 25/00* (2006.01)

(52) U.S. Cl.
CPC ............ *H04R 1/1091* (2013.01); *G10L 25/84* (2013.01); *H04R 1/1083* (2013.01); *H04R 25/00* (2013.01); *H04R 2201/107* (2013.01); *H04R 2460/01* (2013.01); *H04R 2460/05* (2013.01)

(56) References Cited

U.S. PATENT DOCUMENTS

| | | | | |
|---|---|---|---|---|
| 2012/0289162 | A1* | 11/2012 | Hosoi | H04R 25/606 455/41.3 |
| 2015/0078600 | A1* | 3/2015 | Rasmussen | H04R 25/405 381/318 |
| 2016/0118035 | A1* | 4/2016 | Hyde | H04R 1/1083 381/71.6 |
| 2016/0150330 | A1* | 5/2016 | Niederberger | G10K 11/1788 381/314 |
| 2017/0295425 | A1* | 10/2017 | Grinker | H04R 1/2873 |

OTHER PUBLICATIONS

Jürgen Kiessling, et al., "Occlusion Effect of Earmolds with Different Venting Systems"; Journal of the American Academy of Audiology, vol. 16, No. 4 (2005).

* cited by examiner

CONTROLLING OWN-VOICE EXPERIENCE OF TALKER WITH OCCLUDED EAR

TECHNICAL FIELD

The present invention relates to techniques for controlling own-voice experience of a user talking when an earpiece is mounted to an ear of the user so as to substantially block airborne sound from entering the ear canal. The present invention is e.g. applicable in connection with in-ear headsets, earphones, in-ear headphones, in-ear monitors, circumaural headphones, hearing aids, earplugs and earmuffs.

BACKGROUND ART

When an object fills or otherwise blocks the outer portion of a person's ear canal, the person perceives "hollow", "muffled" or "booming" sounds of its own voice. This phenomenon is known as the occlusion effect. It is caused by an altered balance between air-conducted and bone-conducted transmission to the human ear. When the ear canal is open, vibrations caused by talking or chewing normally escape through the open ear canal. When the ear canal is blocked, i.e. occluded, the vibrations are instead reflected back towards the eardrum. In fact, vibrations in cartilaginous tissue and bone around the ear canal may result in build-up of relatively high sound pressure levels at the eardrum. In acoustical terms, the occluded ear canal defines a small enclosed volume which has a large acoustic impedance. The acoustic impedance is the ratio of acoustic pressure to acoustic volume velocity. Thus, when the acoustic impedance is large, small changes in volume velocity in the ear canal will generate relatively large pressure variations at the eardrum. This means that an occlusion of the ear canal results in an increase of bone-conducted sound vibrations at the ear drum compared to a non-occluded ear. When the ear is not occluded, the acoustic impedance is instead dominated by the much smaller radiation impedance from the open ear canal to the surroundings. Compared to a completely open ear canal, the occlusion effect may boost low frequency (e.g. below 500 Hz) sound pressure in the ear canal by 20 dB or more.

It may be particularly desirable to counteract the occlusion effect in implements that may require the user to speak while wearing the implement, e.g. various ear- or head-mounted devices for use during telephone conversations, as well as hearing aids.

In the field of telephony, it is known to introduce an electric "sidetone path" in the telephone handset, by instantly feeding the signal from the microphone to the speaker in the earpiece of the handset. This technique will allow the talker to hear his own voice even if the ear is occluded by the earpiece. The provision of an electric sidetone path may restore the lost air-conducted path but does not completely address or counteract the occlusion effect, which generally results in an undesired and unpleasant distortion of the sound perceived by a person when talking, specifically by the balance between low, mid and high frequencies differing from the normal situation of a non-occluded ear.

A hearing aid generally defines an earpiece that occludes the outer end of the ear canal. The hearing aid includes a microphone arranged to pick up sound in the surroundings of the hearing aid, a speaker arranged to generate audible sound in the ear canal, and electronic circuitry configured to amplify and otherwise modify the signal produced by the microphone for supply to the speaker. Thus, the hearing aid also produces an electric sidetone path that allows the bearer to hear his own voice even if the ear is occluded by the hearing aid. For the bearer of a hearing aid, the occlusion effect may introduce an undesired and unpleasant distortion of the sound perceived by the bearer when talking.

The most common approach of dealing with the occlusion effect is to intentionally design the earpiece that occludes the ear with dedicated leaks to its surrounding. These intentional leaks may be implemented as one or more vents or through-holes in the earpiece, which are carefully designed to shunt a portion of low-frequency signals to the environment, removing all or part of the disturbing low-frequency own-voice elements. Examples of vent designs in the field of hearing aids are given the article "Occlusion effect of earmolds with different venting systems", by Kiessling et al, published in Journal of the American Academy of Audiology, 16, 237-249 (2005).

One disadvantage of this approach is that the vent provides an acoustic path for noise to leak into the ear from the environment. The vent may also reduce the bass sensitivity of the occluded ear.

It is a general desire to counteract or reduce the occlusion effect caused by implements that occlude one or both ears of a person. This applies not only to implements that are naturally used by the person while talking, such as telephone headsets and hearing aids, but also to other implements which may be used while talking and in which the amplification of bone-conducted sound by the occlusion effect is undesired and may interfere with the user experience, e.g. in ear- or head-mounted devices for audio (e.g. music) playback, and ear- or head-mounted devices for hearing protection.

BRIEF SUMMARY

It is an objective of the invention to at least partly overcome one or more limitations of the prior art.

Another objective is to provide a technique of controlling a user's perception of the own voice when the user's ear canal is substantially or completely closed off from the surroundings outside the ear.

A further objective is to provide such a technique which is inexpensive and simple to implement.

One or more of these objectives, as well as further objectives that may appear from the description below, are at least partly achieved by a system for controlling talker own-voice experience, and a method of controlling talker own-voice experience according to the independent claims, embodiments thereof being defined by the dependent claims.

A first aspect of the invention is a system for controlling talker own-voice experience comprises: an earpiece adapted for mounting to an ear of a user so as to substantially block airborne sound from entering the ear canal of said ear; a speaker element integrated with the earpiece; a signal generator for the speaker element; and a vibration sensor configured to engage the user's head and generate an output signal representative of vibrations formed by the user speaking and conducted by the user's head to the vibration sensor; wherein the signal generator is configured to operate the speaker element to generate first sound waves in the ear canal based on the output signal of the vibration sensor.

Additionally, in some embodiments, the earpiece, when mounted to the ear, causes an occlusion effect in the ear canal, and the signal generator is configured to operate the speaker element to counteract the occlusion effect.

Additionally, in some embodiments, the signal generator is configured to operate the speaker element to generate the first sound waves to at least partially cancel second sound waves that are generated by at least part of said vibrations entering the ear canal from surrounding bone and/or tissue.

Additionally, in some embodiments, the signal generator is configured to set the phase and/or amplitude of the first sound waves based on the output signal.

Additionally, in some embodiments, the signal generator is configured to generate a drive signal for the speaker element by passing the output signal through one or more of an inverter, an amplifier, a delay element and a spectral filter.

Additionally, in some embodiments, the system further comprises a user interface for manipulating the signal generator to modify the first sound waves.

Additionally, in some embodiments, the system further comprises a microphone for arrangement in the ear canal, and the signal generator is connected to the microphone and configured to adaptively modify, based on a microphone signal from the microphone, at least one control parameter of the signal generator when operating the speaker element to generate the first sound waves.

Additionally, in some embodiments, the vibration sensor is integrated with the earpiece so as to engage the user's head when the earpiece is mounted to the ear of the user.

Additionally, in some embodiments, the vibration sensor is arranged for insertion into the ear canal.

Additionally, in some embodiments, the signal generator is integrated into the earpiece.

Additionally, in some embodiments, the signal generator is further configured to receive at least one utility signal and operate the speaker element, or an auxiliary speaker element, to generate third sound waves in the ear canal corresponding to the utility signal.

Additionally, in some embodiments, the utility signal is one of a microphone signal representing airborne sound in the surroundings of the earpiece, a microphone signal representing airborne sound generated by the user speaking, and a remotely generated and electronically transmitted audio signal.

Additionally, in some embodiments, the system further comprises a microphone for detecting the airborne sound and generating the utility signal.

Additionally, in some embodiments, the signal generator is further configured to receive a voice activity signal from a voice activity detector configured to detect when the user talks, and wherein the signal generator is configured to operate the speaker element to generate the first sound waves when the voice activity signal indicates a voice activity of the user.

Additionally, in some embodiments, the earpiece comprises a tip for mounting in the ear canal.

Additionally, in some embodiments, the earpiece is configured to encompass the outer ear.

Additionally, in some embodiments, at least the earpiece is part of one of a headset, an earphone, an in-ear headphone, an in-ear monitor, an over-ear headphone, a helmet, a hearable, an earplug, an earmuff, and a hearing aid.

A second aspect of the invention is a method of controlling talker own-voice experience of a user when an earpiece is mounted to an ear of the user so as to substantially block airborne sound from entering the ear canal of said ear. The method comprises: obtaining an output signal from a vibration sensor arranged to engage the user's head, the output signal representing vibrations formed by the user speaking and conducted by the user's head to the vibration sensor; and operating a speaker element in the earpiece to generate first sound waves in the ear canal based on the output signal of the vibration sensor.

Additionally, in some embodiments, the method further comprises operating the speaker element to generate the first sound waves to at least partially cancel second sound waves that are generated by at least part of said vibrations entering the ear canal from surrounding bone and/or tissue.

Additionally, in some embodiments, the method further comprises operating the speaker element to set the phase and/or amplitude of the first sound waves based on the output signal.

A third aspect of the invention is a computer-readable medium comprising computer instructions which, when executed by a processor, cause the processor to perform the method of the second aspect or any of its embodiments.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
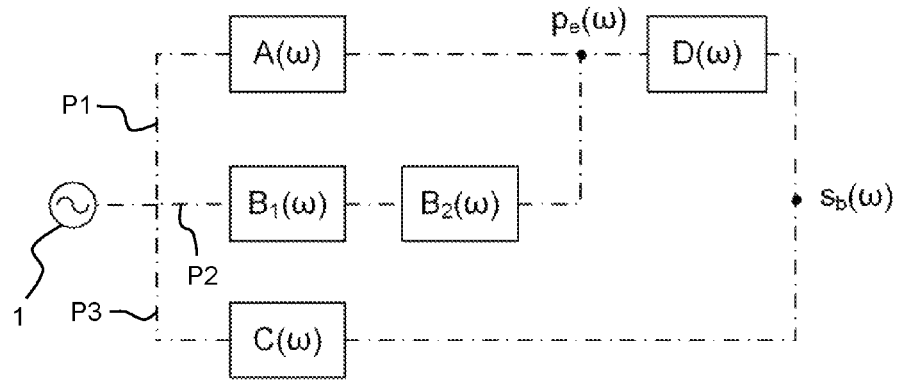
FIG. 1 is a schematic block diagram of physiological signal paths that allow an individual to perceive its own voice.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Embodiments of the invention are directed to a technique of improving a person's perception of its own voice when wearing an implement that blocks, or substantially blocks, the ear canal. Generally, this is achieved by the use of one or more speakers, one or more vibration sensors, an analog and/or digital signal generator, and optionally one or more microphones. As used herein, an implement is considered to "substantially block" or "substantially occlude" the ear canal of a person when the person, in absence of the inventive technique, would experience an occlusion effect caused by the implement.

As used herein, a speaker refers to an electroacoustic transducer or "driver" that converts an electrical signal into a corresponding air-conducted signal. This driver is also commonly referred to as a "speaker element" or "speaker capsule" in the art. The speaker may be of any kind, including but not limited to electrostatic speakers, magnetostrictive speakers, magnetostatic speakers, ribbon speakers, bending wave speakers, flat panel speakers, and thermoacoustic speakers.

As used herein, a vibration sensor is a device capable of converting mechanical vibrations into an electric signal that represents the magnitude of the vibrations over time. The vibration sensor is typically not responsive to air conducted sounds. The vibration sensor may be of any kind, including but not limited to inertial sensors, accelerometers, and force sensors.

As used herein, a signal generator is electronic circuitry configured to receive one or more input signals, e.g. from the one or more vibration sensors and the one or more microphones, and generate a drive signal for the one or more speakers. The electronic circuitry may be configured for purely analog signal processing, purely digital signal processing, or a combination of analog and digital signal processing.

As used herein, a microphone is an airborne sound sensing transducer that converts an air-conducted signal into an electrical signal. The microphone may be of any kind, including but not limited to electret microphones, magnetodynamic microphones, condenser microphones, piezoelectric microphones, fiber optic microphones, and MEMS microphones. As used herein, sound or a sound wave is a vibration that propagates as an audible mechanical wave of pressure and displacement through a medium.

Figure 2:
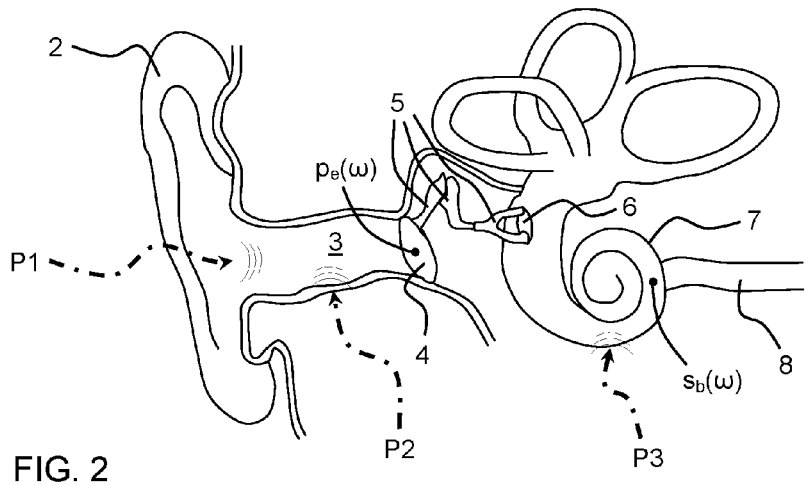
FIG. 2 is a schematic section view of an ear.

Generally, the own-voice perception is formed by sound waves that are generated by the vocal chords and modulated by the vocal tract and then transmitted for receipt by the auditory system. The sound waves may be received by the auditory system on different signal paths. FIG. 1 schematically indicates three main signal paths P1, P2, P3 from the vocal chords 1 to the basilar membrane in the inner ear of a human individual. The signal paths P1, P2, P3 are also indicated in FIG. 2, which schematically represents the human auditory system, i.e. the human ear. On signal path P1, sound waves are conducted in free air into the ear. As seen in FIG. 2, these airborne sound waves are collected by the auricle (outer ear) 2, enter the ear opening and propagate along the ear canal 3 to the eardrum 4. On signal path P1, the sound waves are modified by a transfer function $A(\omega)$, which is indicated as a blackbox in FIG. 1. On signal path P2, sound waves are conducted by the skull and enter the ear canal 3 through the tissue and bone surrounding the ear canal 3. As used herein, the skull includes the cranium and the mandible (cheekbone or jawbone). The sound waves cause the circumferential wall of the ear canal 3 to vibrate, which produces corresponding pressure variations in the ear canal 3. At least some of the pressure variations reach the eardrum 4. On signal path P2, the sound waves are modified, in sequence, by a first transfer function $B_1(\omega)$, which represents the modifications on the sub-path from the vocal chords 1 to the circumferential wall of the ear canal 3, and a second transfer function $B_2(\omega)$, which represents the modifications on the sub-path from the circumferential wall of the ear canal 3 to the eardrum 4. As indicated in FIG. 1, temporal pressure variations $p_e(\omega)$ at the eardrum 4 are formed by a combination of sound waves reaching the eardrum 4 on paths P1 and P2. The pressure variations $p_e(\omega)$ cause the eardrum 4 to vibrate, and these vibrations are transferred by the ossicles 5 and via the elliptical window 6 to the cochlea 7, where they cause an excitation of the basilar membrane (not shown). The transfer function for this process is represented as $D(\omega)$ in FIG. 1. A further excitation of the basilar membrane may occur via the signal path P3, on which sound waves propagate through the skull directly to the cochlea 7. The transfer function of path P3 is represented as $C(\omega)$ in FIG. 1. The own-voice perception is given by the total excitation $s_b(\omega)$ of the basilar membrane, which results in an electrical signal being transmitted from hair cells to the brain via the auditory nerve 8.

When the opening to the ear canal 3 is open, i.e. nonoccluded, the sound waves from the vocal chords 1 reach the basilar membrane on all three signal paths P1-P3 to form a frequency distribution of the own voice that is familiar to the talker. This frequency distribution changes dramatically when the opening is occluded. The signal path P1 effectively disappears ($A(\omega) \approx 0$), causing a loss of treble. As explained in the Background section, the transfer function $B_2(\omega)$ on signal path P2 increases considerably, in particular for frequencies in the low and mid range, i.e. frequencies below about 2 kHz. In certain applications, the disappearance of the signal path P1 may be desirable, e.g. in devices for hearing protection or in headphones and in-ear phones for playing music. In other applications, the signal path P1 may be restored by the provision of an electric sidetone path that recreates the airborne sound inside the ear canal 3. The electric sidetone path may be provided by arranging an external microphone to register the airborne sound generated by the vocal chords 1 and operating a speaker to recreate the airborne sound inside the ear canal 3. Such an electric sidetone path may be able to restore the treble lost by the occlusion, but the low and mid frequency range will still be dominated by sound waves originating from signal path P2. Thus, occlusion of the ear will cause the spectral balance of the own voice to be unfamiliar and often uncomfortable to the talker.

Figure 3:
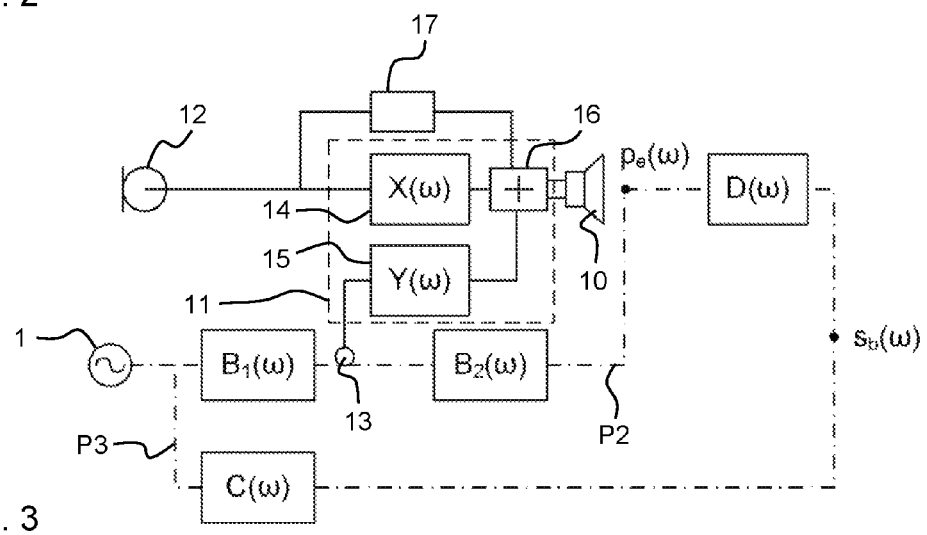
FIG. 3 is a schematic block diagram that illustrates an exemplary system for controlling talker own-voice experience together with the physiological signal paths of FIG. 1.

FIG. 3 shows an example of a system capable of fully or at least partially restoring the spectral balance of a person's own voice. In FIG. 3, the signal paths and the corresponding transfer functions are illustrated in correspondence with FIG. 1. In addition to the components shown in FIG. 3, the system includes an earpiece that is mounted to the ear so as to block or substantially block airborne sound from entering the ear canal 3. As will be further exemplified below, the earpiece may be an implement inserted into the ear canal 3 of the user or an implement that encompasses the outer ear and is applied externally to the skull of the person. Since the ear is occluded, signal path P1 is absent in FIG. 3.

In the illustrated example, the system includes a speaker 10 configured to generate sound waves in the ear canal 3. The speaker 10 is operated by a drive signal from a signal generator 11. The signal generator 11 is connected to receive a microphone signal from a microphone 12 which is arranged to register airborne sound outside of the occluded ear, and a vibration signal from a vibration sensor 13 which is arranged in contact with the circumferential wall of the ear canal 3 to detect the mechanical vibrations that are formed by the sound waves on signal path P2 (FIG. 2). The signal generator 11 includes a first signal modifier 14 configured to apply a transfer function $X(\omega)$ to the microphone signal and generate a first sub-signal, and a second signal modifier 15 configured to apply a transfer function $Y(\omega)$ to the vibration signal and generate a second sub-signal. The sub-signals are combined in a signal combiner 16 to form the drive signal for the speaker 10.

The combination of the microphone 12, the signal modifier 14 and the speaker 10 defines an electric sidetone path that restores the signal path P1 for airborne sound. Thus, the signal modifier 14 is suitably configured with a transfer function $X(\omega)$ such that the total transfer function of the electric sidetone path is similar to the transfer function $A(\omega)$ of the signal path P1.

The combination of the vibration sensor 13, the signal modifier 15 and the speaker 10 defines an electric cancellation path that counteracts the enhanced sound wave caused by the change in $B_2(\omega)$ from a non-occluded to an occluded ear. The signal modifier 15 is configured to generate the second sub-signal as an "anti-signal" that causes the speaker 10 to generate a sound wave that cancels at least part of the enhanced sound wave originating from signal path P2. In certain embodiments, the signal modifier 15 may be configured to completely cancel the sound wave that originates from the signal path P2.

Figure 4A:
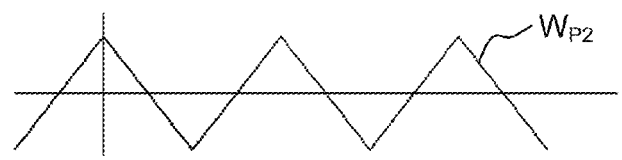
FIGS. 4A-4C illustrate exemplary sound waves generated in the ear canal by the system in FIG. 3.
Figure 4B:
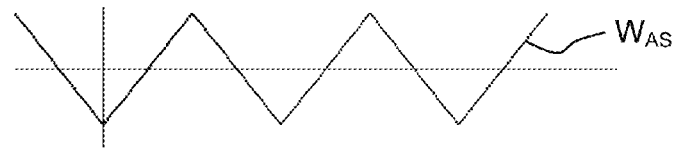
Figure 4C:
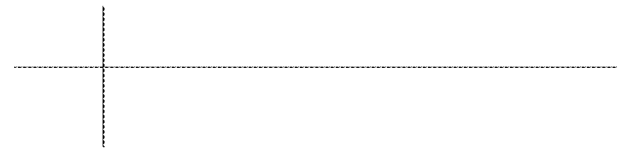

FIGS. 4A-4C illustrate the principles of the electric cancellation by signal modifier 15. FIG. 4A illustrates a sound wave $W_{P2}$, in this simplified example a triangle wave, which originates from the signal path P2 and should be reduced or canceled. Based on the recorded vibration signal from the vibration sensor 13, the signal modifier 15 generates an anti-signal that causes the speaker 10 to transmit an anti-signal sound wave $W_{AS}$ in the ear canal 3. In the illustrated example, FIG. 4B, the anti-signal sound wave $W_{AS}$ has the same amplitude as the sound wave $W_{P2}$ but an inverted phase. Thereby, as seen in FIG. 4C, the sound waves $W_{AS}$, $W_{P2}$ cancel each other completely at the eardrum 4 when they are combined in the ear canal 3.

Generally, the signal modifier 15 may be seen to set at least one of the phase and the amplitude of the anti-signal sound wave $W_{AS}$ based on the vibration signal from the vibration sensor 13. In one embodiment, the signal modifier 15 generates the anti-signal as a modified version of the vibration signal, e.g. by subjecting the vibration signal to polarity inversion and amplitude and phase shaping (as a function of frequency). The signal modifier 15 may also be configured to apply one or more spectral filters to the vibration signal. Structurally, the signal modifier 15 may thus comprise one or more of at least one spectral filter (for changing the frequency content), at least one amplifier (for changing the magnitude), at least one delay element (for changing the phase), and at least one inverter (for changing the polarity). The processing of the vibration signal by the signal modifier 15 when generating the anti-signal yields the transfer function $Y(\omega)$.

The signal modifier 15 may be configured with a specific transfer function $Y(\omega)$ with knowledge about the transfer function $B_2(\omega)$ when the ear is occluded, so as to achieve a reduction of the occlusion effect based on the vibration signal. The transfer function $B_2(\omega)$ may e.g. be obtained by measurements on a population of different individuals, or by measurements on the specific individual to wear the occluding earpiece.

Alternatively or additionally, the system may be configured to allow the transfer function $Y(\omega)$ to be tuned by the user (or by service personnel) to achieve a desired spectral balance of the user's own voice when the ear is occluded. The tuning may be achieved by the user manipulating one or more small controls on the earpiece (cf. 105 in FIGS. 5-7), causing one or more settings (control parameters) of the signal generator 11 to change. Alternatively, the user may be able to change the one or more control parameters of the signal generator 11 via a graphical user interface on a separate electronic device which is connected to the earpiece by wire or wirelessly, such as a mobile phone, a media player, a computer, etc. For example, the user may be allowed to change one or more control parameters of the above-mentioned spectral filter(s), amplifier(s), delay element(s) and inverter(s) of the signal modifier 15.

Alternatively or additionally, the system may be configured to adaptively adjust these one or more control parameters, as described further below with reference to FIG. 11.

In the example of FIG. 3, the system further includes a so-called voice activation detector 17, which is configured to process the microphone signal for detection of human speech. Voice activation detectors (VAD) are commercially available and well-known in the art. The VAD 17 outputs a VAD signal indicating absence or presence of human speech. The VAD signal is received by the signal generator 11, which operates to selectively transmit the anti-signal to the speaker when the VAD signal indicates that the user speaks. In the illustrated example, the VAD signal is supplied to the combiner 16 which thereby selectively combines the anti-signal from the modifier 15 with the sub-signal from the signal modifier 14. In a variant, not shown, the VAD signal is instead supplied to the signal modifier 14, which is controlled to only generate the anti-signal when the VAD signal indicates that the user speaks. The VAD 17 is optional and may be combined with all embodiments disclosed herein. It should be understood that the VAD 17 need not be connected to the microphone 12 but could be a separate unit with a dedicated sensor for voice detection.

Referring to FIG. 3, it should also be noted that the signal modifiers 14, 15 need not be connected to a common speaker via a signal combiner 16, but could be connected to a respective speaker. In such an embodiment, the signal combiner 16 is omitted.

Although not shown in FIG. 3, the signal generator 11 may be configured to receive at least one further signal and supply the further signal(s) to the speaker 10, via the signal combiner 16, for generating sound waves in the ear canal 3. Such a further signal may be any type of audio signal that the user may want to listen to, e.g. a music signal, a radio signal, an incoming call signal supplied by a telephone, etc. It is also conceivable that such a system is configured without the electric sidetone path that restores the airborne signal path P1, i.e. the microphone 12 and the signal modifier 14 are omitted.

Generally, FIG. 3 may be seen to disclose a system which is configured, in addition to reducing the occlusion effect, to receive at least one utility signal and operate the speaker 10, or an auxiliary speaker (not shown), to generate corresponding sound waves in the ear canal 3, where the utility signal may be a microphone signal representing airborne sound in the surroundings of the earpiece that occludes the ear, a microphone signal representing airborne sound generated by the user speaking when the earpiece occludes the ear, or a remotely generated and electronically transmitted sound signal (music, telephone call, etc). This type of system with playback of a utility signal may e.g. be applied in connection with headsets or similar appliances for use with an external electronic device (music player, media player, mobile phone, etc), in connection with hearing aids, in connection with electronic (active) hearing protection devices that block loud and harmful sounds while passing environmental sounds and speech, e.g. as used by military, police and hunters, and in connection with helmets. The system may also be applied in connection with so-called hearables (as known as smart headphones or smart advisors), which are advanced in-ear-devices that combine wearable technology with audio-based information services, conventional rendition of music and wireless telecommunication. Hearables may be designed for purposes ranging from wireless transmission to communication objectives, medical monitoring and fitness tracking.

In another alternative, the system in FIG. 3 is modified by removing the microphone 12, the signal modifier 14 and the signal combiner 16, and connecting the signal modifier 15 directly to the speaker 10. Such a system without both electric sidetone path and input of a utility signal may be used in passive hearing protection devices that block external sounds. In both passive and active hearing protection devices the earpieces may be configured as either earplugs for insertion in the ear canal 3 or earmuffs for covering the auricle 2.

Figure 5:
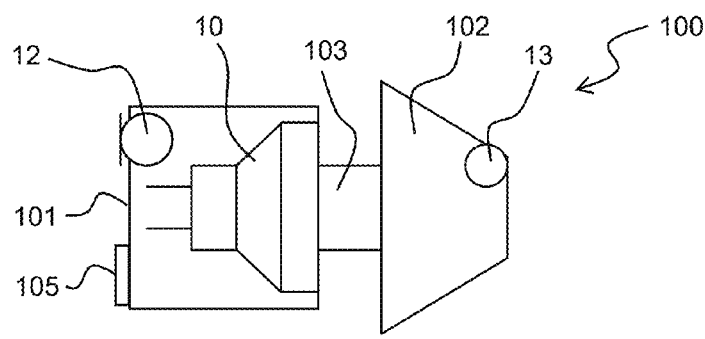
FIG. 5 is a schematic see-through side view of an exemplary earpiece.

FIG. 5 shows an example of an earpiece 100 that integrates at least part of the system in FIG. 3. For ease of understanding, FIG. 5 also shows internal components that normally are hidden from view, such as the speaker 10, the microphone 12, and the vibration sensor 13. The earpiece 100 in FIG. 5 is configured for insertion in the outer opening of the ear canal 3. The earpiece 100 comprises a miniaturized shell, case or housing 101 in the form of an earplug, which may have the shape as shown, or any other suitable shape, with an ear canal tip or dome 102 designed to fit in the ear canal 3 and be supported therein and by the immediately adjacent portion of the auricle 2. The housing 101 may be formed of plastic, silicone, metal, or other suitable material. The tip 102 may be of either formable or pre-molded material. The housing 101 holds the speaker 10, which is arranged to face the insertion end of the earpiece 100 in alignment with a hollow tube portion 103 that extends from the housing 101 to define an open outlet opening. Thereby, sound waves generated by the speaker 10 will propagate through the tube portion 103 and via the outlet opening into the ear canal 3. The tip 102 is attached to or integrally formed with the tube portion 103. The vibration sensor 13 is arranged beneath the tip 102 at the insertion end. The housing 101 further holds the microphone 12, which is arranged at the back end of the housing 101 and is exposed to pick up airborne sound in the surroundings of the earpiece 100.

In an alternative embodiment, the microphone 12 may be spaced from the earpiece 100, e.g. located on a wire connected to the earpiece 100, such as on a headset wire, or located in an electronic device connected to the earpiece 100, such as a mobile phone. As understood from the foregoing, the microphone 12 may also be omitted from the system.

In the example of FIG. 5, the earpiece also includes a user interface 105 that allows the user to modify the anti-signal sound waves generated by the system, e.g. by modifying the above-mentioned control parameters of the signal modifier 15.

It is conceivable that the earpiece 100 also contains the signal generator 11 and the VAD 17 (if present). Such an earpiece 100 may be a standalone device that also contains a power supply, such as a battery.

In an alternative embodiment, the earpiece 100 is configured to be connected, wirelessly or by wire, to an external device. All or part of the signal generator 11 and the VAD 17 (if present) may be implemented by the external device. The earpiece 100 may be powered by the external device.

Figure 6:
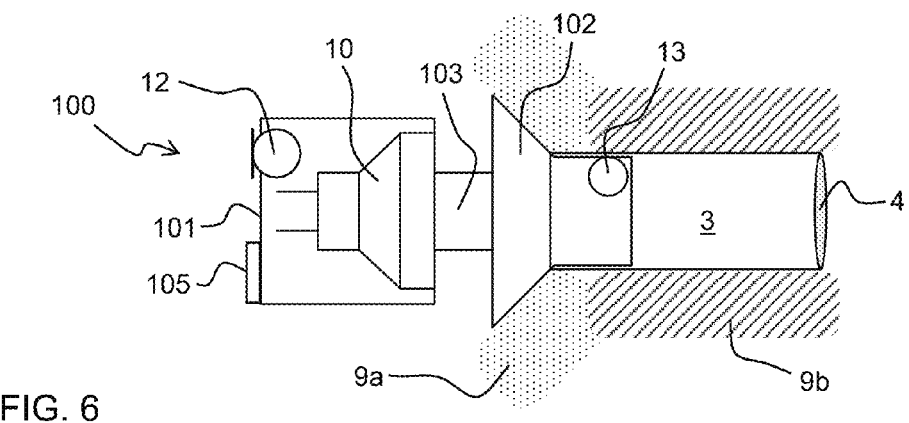
FIG. 6 is a schematic view of the earpiece in FIG. 5 when inserted into an ear canal.

FIG. 6 shows the earpiece 100 of FIG. 5 mounted in an ear canal 3. As seen, the tip 102 is deformed into engagement with skull tissue 9a, e.g. cartilaginous tissue, and skull bone 9b that define the circumferential wall of the ear canal 3. By the deformation of the tip 102, the vibration sensor 13 is brought into firm engagement with the circumferential wall of the ear canal 9, via the material of the tip 102. Thereby, the vibration sensor 13 is operable to sense and quantify the temporal movement (vibration) of the circumferential wall.

Figure 7:
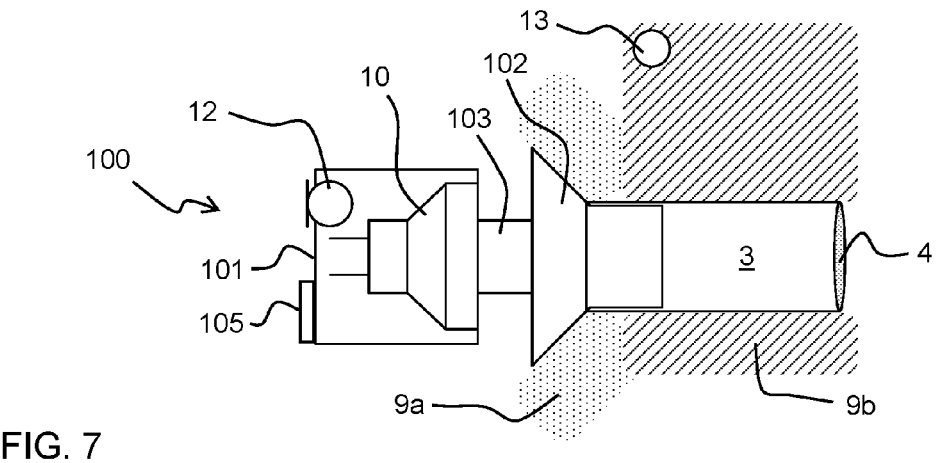
FIG. 7 illustrates a variant of the earpiece in FIG. 5.

FIG. 7 shows an earpiece 100 that lacks integrated vibration sensor 13. Instead a separate vibration sensor 13 is engaged with the skull bone 9b spaced from the ear canal 3. The vibration sensor 13 may be connected by wire (not shown) to the earpiece 100. It is important to understand that the system in FIG. 3 does not require the vibrations to be measured at the circumferential wall of the ear canal 3. A sufficiently accurate estimate of the vibrations of the circumferential wall may be obtained by measuring vibrations of the skull bone 9b spaced from the ear canal 3, e.g. at the side of the head above the auricle, as shown in FIG. 7, or on the cheekbone.

Figure 8:
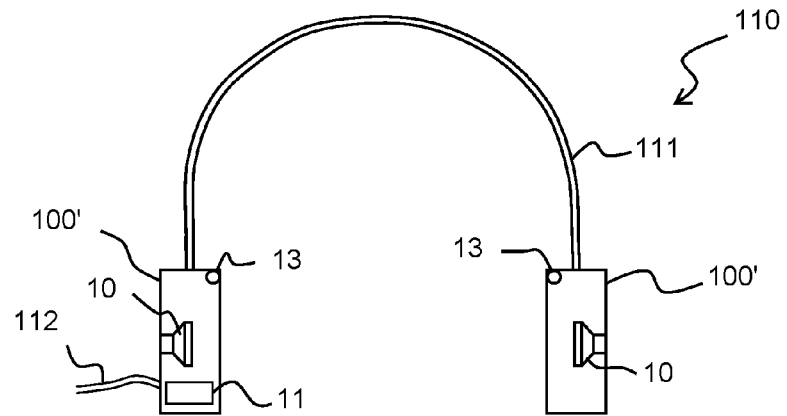
FIG. 8 is a schematic front view of an exemplary headphone with occluding earpieces.

FIG. 8 shows an over-ear (circumaural) headphone 110 which has two earpieces 100' in the shape of cups, which are configured to be applied over the respective ear of the wearer. Thereby, the respective earpiece 101' encompasses the auricle and occludes the ear canal. The earpieces 100', which are configured to reduce the occlusion effect, are mechanically supported by a headband 111 for arrangement on the head of the wearer. Each earpiece 100' includes a speaker 10 and a vibration sensor 13. The vibration sensor 13 is arranged for engagement with the skull bone of the wearer so as to sense vibrations at a location spaced from the ear canal. A signal generator 11 is arranged in one of the earpieces 100' to generate an anti-signal based on the output of the respective vibration sensor 13 and supply the anti-signal signal to the respective speaker 10. The signal generator 11 is also configured to receive a utility signal via cable 112 and convey a corresponding signal to the speakers 10. The cable 112 also supplies power to the signal generator 11.

Figure 9:
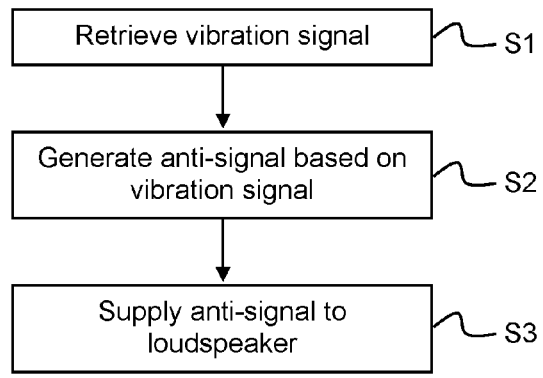
FIG. 9 is a flow chart of an exemplary method of controlling talker own-voice experience.

Embodiments of the invention may also be described as a method for restoring, fully or in part, the spectral balance of a person's own voice when an earpiece is mounted to an ear of the person so as to substantially block airborne sound from entering the ear canal. FIG. 9 is a flow chart of an exemplary method, which may be executed by the signal generator 11 in FIG. 3. The method involves a step S1 of retrieving the vibration signal from the vibration sensor 13, which is arranged in engagement with the skull to sense vibrations that originate from sound waves that have propagated on the signal path P2, i.e. from the vocal chords through the skull to the vibration sensor 13. The method further involves a step S2 of generating the anti-signal based on the vibration signal, and a step S3 of supplying the anti-signal to the speaker 10 so as to generate sound waves in the ear canal 3 that at least partially cancel sound waves in the ear canal 3 that originate from the signal path P2.

The method may be implemented by the above-mentioned signal generator 11. To the extent that the signal generator 11 is configured to perform the method by digital signal processing, the method may be implemented by software instructions running on a processing device, such as a microprocessor, microcontroller, DSP, etc. The software instructions are supplied on a computer-readable medium for execution by the processing device in conjunction with an electronic memory in the signal generator 11. The computer-readable medium may be a tangible product (e.g. magnetic medium, optical disk, read-only memory, flash memory, etc) or a propagating signal.

Figure 10:
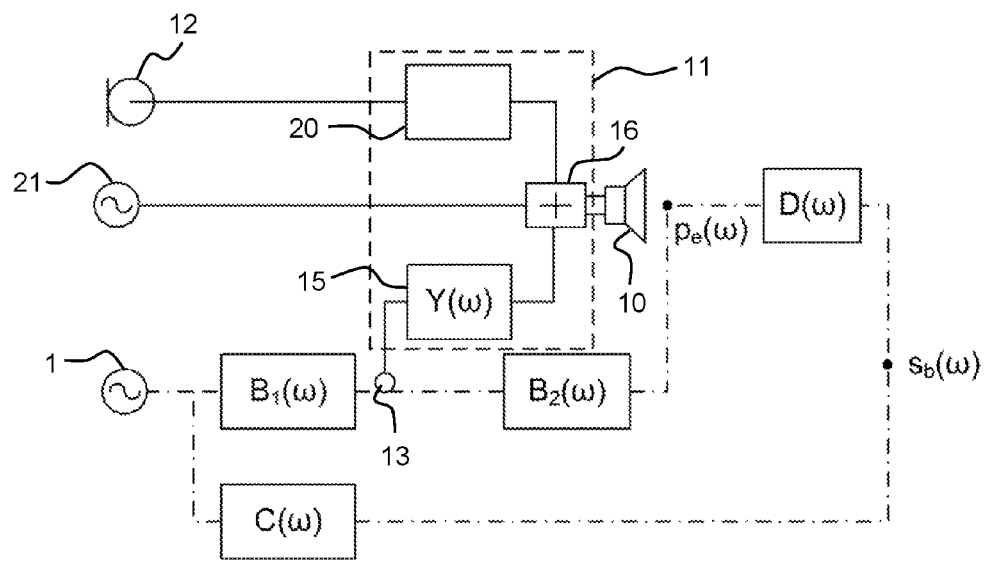
FIGS. 10-11 illustrate variants of the system in FIG. 3.

It should be understood that embodiments of the invention may be combined with conventional active noise cancellation (ANC). FIG. 10 shows an example of a system including a noise controller 20 implementing feed-forward control. The noise controller 20 is connected to receive a microphone signal from a microphone 12 which is placed at the exterior of the occluding implement to detect incoming ambient noise. The noise controller 20 is configured to generate a noise cancelling signal by setting coefficients of a feed-forward filter operating on the microphone signal. The noise cancelling signal is supplied to the combiner 16. In the illustrated example, the combiner 16 combines the noise cancelling signal with both the anti-signal from the signal modifier 15 and an audio signal from an audio signal source 21. The audio signal may be any type of signal that the user may want to listen to, e.g. a music signal, a radio signal, an incoming call signal supplied by a telephone, etc. Noise controllers are well-known in the art and will not be described in further detail. It may be noted that the noise controller 20 operates independently of the signal modifier 15, and that the signal modifier 15 operates to further improve the user's perception of the audio signal in case the user talks while listening to the audio signal.

Figure 11:
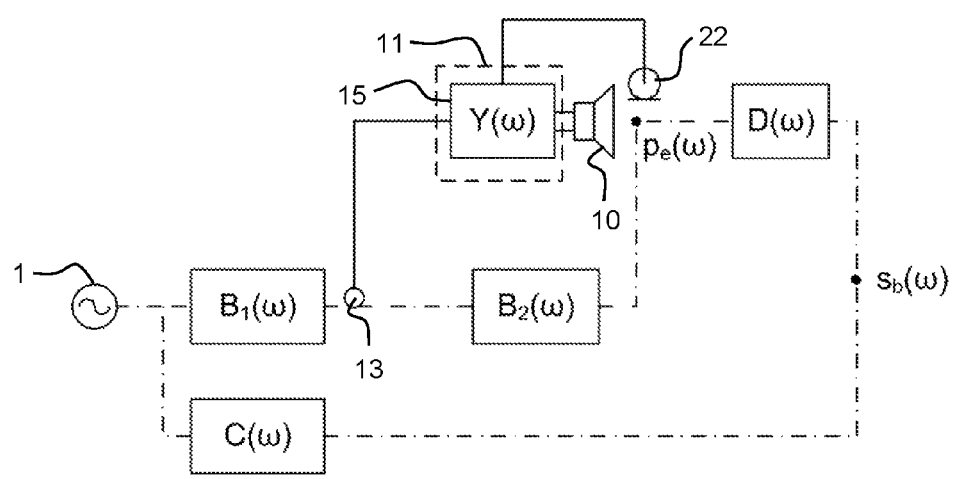

FIG. 11 shows a variant of the system in FIG. 3. In this variant, the signal modifier 15 is connected to receive a microphone signal from an internal microphone 22, which is located to detect sound in the ear canal. With reference to FIGS. 5 and 8, the microphone 22 may be integrated in the earpiece 100, 100' so as to be exposed to the ear canal 3 when the earpiece 100, 100' is mounted to the ear. The signal modifier 15 is configured to adaptively adjust one or more control parameters, e.g. a parameter of any one of the above-mentioned spectral filter(s), amplifier(s), delay element(s) and inverter(s), so as to achieve a desired sound pattern in the ear canal, as detected by the microphone 22. It should be understood that the embodiment in FIG. 11 may also include one or more of an electric sidetone path, e.g. as shown in FIG. 3, an audio signal input path, e.g. as shown in FIG. 10, and active noise cancellation, e.g. as shown in FIG. 10.

As understood from the foregoing disclosure, embodiments of the invention provide a technique that improves the talking situation of a user with an occluded ear, by reducing the user's perception of bone-conducted sounds in one or more frequency bands. The technique allows the eardrum to be isolated from airborne sounds (passive noise cancellation) since the earpiece is arranged to seal off the ear canal. The technique may use standard components and is thereby inexpensive and simple to implement. The technique may be combined with active noise cancellation and/or an electric sidetone path. Further, the bass performance for audio reproduction in the ear canal is not compromised by the use of the technique.

It should also be noted that the embodiments disclosed in the foregoing may be equally applied to suppress bone-conducted sounds with other origin than the vocal chords, e.g. chewing, swallowing, walking, throat clearing and even breathing.

What is claimed is:

1. A system for controlling talker own-voice experience, comprising:
    an earpiece adapted for mounting to an ear of a user at an opening of an ear canal of the user so as to substantially block airborne sound from entering the ear canal of said ear, wherein the earpiece, when mounted to the ear, causes an occlusion effect of the ear canal,
    a speaker element integrated with the earpiece and arranged to emit sound into the ear canal of the user,
    a signal generator for the speaker element, and
    a vibration sensor configured to engage the user's head and generate an output signal representative of vibrations formed by the user speaking and conducted by the user's head to the vibration sensor,
    wherein the signal generator is configured to operate the speaker element with a signal resulting from applying a transfer function to the output signal of the vibration sensor, the transfer function implemented to counteract the occlusion effect by causing the speaker element to generate first sound waves in the ear canal that at least partially cancel user audible sound resulting from the vibrations formed by the user speaking and conducted by the user's head.

2. The system of claim 1, wherein the signal generator is configured to operate the speaker element to generate the first sound waves to at least partially cancel second sound waves that are generated by at least part of said vibrations entering the ear canal from surrounding bone and/or tissue.

3. The system of claim 1, wherein the signal generator is configured to set the phase and/or amplitude of the first sound waves based on the output signal.

4. The system of claim 1, wherein the signal generator is configured to generate a drive signal for the speaker element by passing the output signal through one or more of an inverter, an amplifier, a delay element and a spectral filter.

5. The system of claim 1, further comprising a user interface for manipulating the signal generator to modify the first sound waves.

6. The system of claim 1, further comprising a microphone for arrangement in the ear canal, and wherein the signal generator is connected to the microphone and configured to adaptively modify, based on a microphone signal from the microphone, at least one control parameter of the signal generator when operating the speaker element to generate the first sound waves.

7. The system of claim 1, wherein the vibration sensor is integrated with the earpiece so as to engage the user's head when the earpiece is mounted to the ear of the user.

8. The system of claim 1, wherein the vibration sensor is arranged for insertion into the ear canal.

9. The system of claim 1, wherein the signal generator is further configured to receive at least one utility signal and operate the speaker element, or an auxiliary speaker element, to generate third sound waves in the ear canal corresponding to the utility signal.

10. The system of claim 1, wherein the signal generator is further configured to receive a voice activity signal from a voice activity detector configured to detect when the user talks, and wherein the signal generator is configured to operate the speaker element to generate the first sound waves when the voice activity signal indicates a voice activity of the user.

11. The system of claim 1, wherein at least the earpiece is part of one of a headset, an earphone, an in-ear headphone, an in-ear monitor, an over-ear headphone, a helmet, a hearable, an earplug, an earmuff, or a hearing aid.

12. A method of controlling talker own-voice experience of a user when an earpiece is mounted to an ear of the user at an opening of an ear canal of the user so as to substantially block airborne sound from entering the ear canal of said ear and causes an occlusion effect of the ear canal, said method comprising:
  obtaining an output signal from a vibration sensor arranged to engage the user's head, the output signal representing vibrations formed by the user speaking and conducted by the user's head to the vibration sensor, and
  operating a speaker element in the earpiece and arranged to emit sound into the ear canal of the user to generate first sound waves in the ear canal, a signal driving the speaker element to generate the first sound waves resulting from applying a transfer function to the output signal of the vibration sensor, the transfer function implemented to counteract the occlusion effect so that the first sound waves at least partially cancel user audible sound resulting from the vibrations formed by the user speaking and conducted by the user's head.

13. The method of claim 12, wherein the first sound waves at least partially cancel second sound waves that are generated by at least part of said vibrations entering the ear canal from surrounding bone and/or tissue.

14. A non-transitory computer-readable medium comprising computer instructions which, when executed by a processor, cause the processor to control talker own-voice experience of a user when an earpiece is mounted to an ear of the user at an opening of an ear canal of the user so as to substantially block airborne sound from entering the ear canal of said ear and causes an occlusion effect of the ear canal, comprising instructions to:
  obtain an output signal from a vibration sensor arranged to engage the user's head, the output signal representing vibrations formed by the user speaking and conducted by the user's head to the vibration sensor, and
  operate a speaker element in the earpiece and arranged to emit sound into the ear canal of the user to generate first sound waves in the ear canal, a signal driving the speaker element to generate the first sound waves resulting from applying a transfer function to the output signal of the vibration sensor, the transfer function implemented to counteract the occlusion effect so that the first sound waves at least partially cancel user audible sound resulting from the vibrations formed by the user speaking and conducted by the user's head.

\* \* \* \* \*